Aug. 26, 1924.

N. F. SHARP

ICE CREAM FREEZER

Filed June 5, 1923

1,506,506

Inventor

Nat F. Sharp

By Martin & Rendell

Attorneys

Patented Aug. 26, 1924.

1,506,506

UNITED STATES PATENT OFFICE.

NET F. SHARP, OF MOHAWK, NEW YORK.

ICE-CREAM FREEZER.

Application filed June 5, 1923. Serial No. 643,582.

*To all whom it may concern:*

Be it known that I, NET F. SHARP, a citizen of the United States, and a resident of Mohawk, in the county of Herkimer and State of New York, have invented certain new and useful Improvements in Ice-Cream Freezers; and I do hereby declare that the following is a full, clear, and exact description thereof, which will enable others skilled in the art to which it appertains to make and use the same, reference being had to the accompanying drawings, and to the reference numerals marked thereon, which form part of this specification.

My present invention relates to an ice cream freezer.

The purpose of my invention is to provide an ice cream freezer of new and improved construction and one which is strong and durable in construction and very efficient in operation.

Heretofore ice cream freezers have been commonly constructed so that the cream container rotates in the ice receptacle with the container rotating upon an axis which coincides with the central axis of the circular container.

This construction is inefficient in that it agitates or stirs the broken ice and commingled salt to a very slight extent.

The purpose of my present invention is to overcome this defect by mounting the cream container on an axis eccentric of the container with the result that as the container is moved around in the ice receptacle the side of the receptacle farthest from the center of rotation has a decided stirring and agitating effect upon the ice and salt which constantly stirs and re-locates the ice and salt and brings new ice and salt against the outer surface of the container resulting altogether in much more effective and especially much more rapid freezing of the cream.

A further purpose is to provide a construction which will accomplish the above purpose with very little or no changes in the rest of the freezer and further to point out a construction which is particularly well adapted to secure the said eccentric mounting of the container in a freezer of simple construction.

Further purposes and advantages of my invention will appear from the specification and claims herein.

Figure 1:
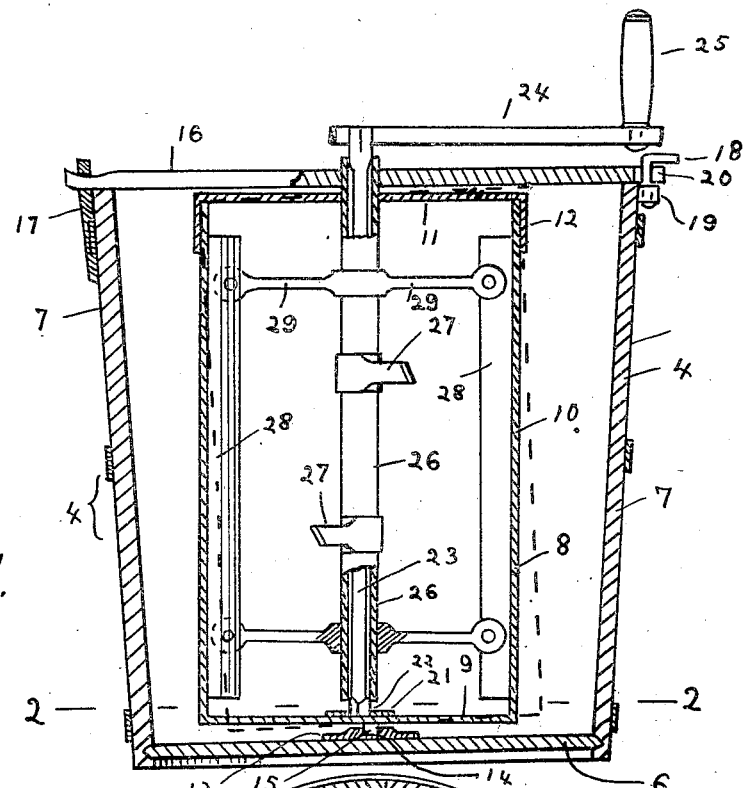
Fig. 1 is a central vertical sectional view of an ice cream freezer embodying my invention.
Figure 2:
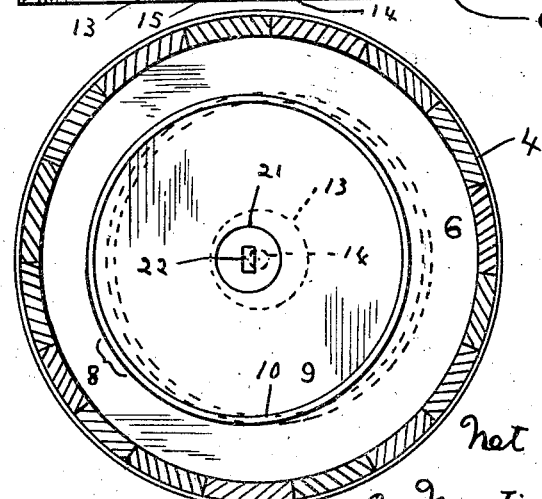
Fig. 2 is a horizontal sectional view on line 2—2 of Fig. 1.

Referring to the drawings in a more particular description it will be seen that the freezer comprises an ice receptacle 4 in the form of a pail having a bottom 6 and side walls 7 together with a cream receptacle 8 mounted in the pail and being cylindrical in form with a flat bottom 9, cylindrical portion 10, cover 11 suitably closely fitted to the main part of the container as by said cover having downwardly extending flange 12 fitting upon the upper exterior portion of the container.

Securely fastened to the interior, that is the upper face of the bottom 6 of the ice receptacle is a plate 13 having in its upper surface a round recess 14 into which sets and in which rotates the downwardly projecting pivot pin 15 secured to the exterior surface, that is the bottom side of the bottom 9 of the cream container 8. The pivot pin 15 is located an appreciable but short distance off of the center of the bottom of said cream container as will be apparent from an examination of the drawings herein. In the drawings in full lines is shown the position of the cream container when its large or projecting side is towards the left and in dotted lines is shown the outline of the cream container when its said large or projecting side has been moved around so that it projects to the right.

Preferably as shown in the drawings only the bottom end of the cream container will be mounted eccentrically while the top end of said container will be mounted on its central axis in any convenient way as has been done heretofore. In this way practically any of the means heretofore used for rotating the cream container and for holding the dashers stationary relative to the receptacle or moving them relative to the container may still be utilized. The stirring action obtained by the eccentric mounting of the container at its bottom will get a very decided stirring action at the bottom of the pail and progressively less of stirring action as the top of the pail is approached. This stirring action I have found is easily obtained and is very effective in that it churns the cracked ice, salt and cold water very decidedly at the bottom of the pail and constantly brings new ice against the side of the container. This stirring action also has the effect of getting a very close contact between the container from its small side to its large side as it rotates and the stirring around of the ice as it settles back after the large side of the container passes the ice. In this way a much more intimate contact between the exterior surface of the container and the surrounding ice is obtained resulting in the freezing operation being performed much faster. This intimate connection is apparent during the half of the rotation while the container is proceeding from its small side to the large side relative to any adjacent group of ice, but even on the rest of the rotation the settling back and bringing new ice into contact makes the rest of the travel also more intimate and effective, although there may not be present so much pressure as in the other part of the travel. On the average much greater pressure is obtained, as in the old way the container seemed to melt the ice near it and still not stir up the ice enough to bring new ice into intimate contact with the container.

Across the top of the ice receptacle 4 is removably secured a bridge-piece 16 in the usual way as by having one end inserted through the eye of a bracket 17 at one side of the receptacle and by having its other end held down and held from outward movement by a bent pivot pin 18 pivotally mounted in a bracket 19 secured to the receptacle 4 with the vertical part of said pin above the bracket entering a slot 20 in the end of the bridge-piece 16 with the horizontal part of the pin 18 adapted by rotation of the pin to engage the top of the bridge piece.

The bottom 9 of the container 8 is provided on its inner, that is its upper side, with a boss or plate 21 having an elongated or angular shaped slot 22 located concentrically of the bottom of said container and adapted to engage the similar angular shaped bottom end of shaft 23 which extends upward through the container 8 and through the central opening in the container cover 11 and also projects through and above the bridge-piece 16 and there has secured to its upper end a laterally extended crank arm 24 at the outer end of which is an upwardly extending handle 25. Surrounding the shaft 23 from just above the recessed boss 21 upwardly well into or through the bridge-piece 16 is a hollow shaft 26. Upon this hollow shaft are mounted the beaters including the stirring arms 27 and the clearing blades 28 which latter are secured to the outer ends of arms 29 projecting from said hollow shaft. The hollow shaft 26 and the shaft 23 are revoluble relative to each other so that while the cream container is rotated relative to the ice receptacle there is also relative movement between the cream container and the beaters. In the simple form of a freezer shown in the drawings this is accomplished by holding the beaters from rotation, that is stationary relative to the ice receptacle. This is done by having the upper end of the hollow shaft 26 held from rotation by the bridge piece 16 as by having the upper end of said hollow shaft angular in shape, say square, where it extends into the bridge piece 16.

It will now be seen that rotation of the crank arm 24 by means of handle 25 will rotate the upright shaft 23 which in turn will rotate the cream container upon its eccentrically located lower bearing and that the beaters including the arms 27 and the clearing blades 28 through being mounted upon the stationary hollow shaft 26 will be held from rotation relative to the ice receptacle 4 and so there will be the necessary relative movement between the beaters and the cream container. As the shaft 23 is mounted at the center of the container 8 the clearing blades 28 will engage smoothly and equally all parts of the interior surface of the upright wall of the container. The eccentric rotation of the container at its bottom relative to the receptacle gives a slight tilt or inclination to the upper end of the shaft 23 and the hollow shaft 26 but this inclination is not sufficient to interfere with the desired rotation of the shaft by the crank arm nor to interfere with the top of the hollow shaft being held from rotation in the bridge-piece 16. The fit of the squared upper end of the hollow shaft in the bridge-piece is loose enough to permit the hollow shaft to follow the constantly changing position of the shaft 23 on which it is mounted.

What I claim as new and desire to secure by Letters Patent is:

1. In an ice cream freezer the combination of an ice receptacle, a cream container revolubly mounted in said ice receptacle with the axis of rotation of said container eccentric of said container, means for rotating said container, dashers within said cream container and means for securing relative movement between said dashers and said cream container.

2. In an ice cream freezer the combination of an ice receptacle, a circular cream container revolubly mounted in said ice receptacle with the axis of rotation of said container eccentric of said container, means for rotating said container, dashers within said cream container adapted to clear the cream from the inner walls thereof and means for securing relative movement between said dashers and said cream container.

3. In an ice cream freezer the combination of an ice receptacle, a cream container revolubly mounted in said ice receptacle with the axis of rotation of the bottom of said container eccentric of said container, means for rotating said container, dashers within said cream container and means for securing relative movement between said dashers and said cream container.

4. In an ice cream freezer the combination of an ice receptacle, having in its interior bottom one member of a pivot joint, a cream container revolubly mounted in said ice receptacle with a co-operating member of a pivot joint eccentrically located in the bottom exterior of said cream container, means for supporting the top of the container spaced from the receptacle, means for rotating said container, dashers within said cream container and means for securing relative movement between said dashers and said cream container.

5. In an ice cream freezer the combination of an ice receptacle, having in its interior bottom one member of a pivot joint, a circular cream container revolubly mounted in said ice receptacle with a co-operating member of a pivot joint eccentrically located in the bottom exterior of said cream container, means for supporting the top of the container spaced from the receptacle, means for rotating said container, dashers within said cream container and means for securing relative movement between said dashers and said cream container.

6. In an ice cream freezer the combination of an ice receptacle a circular cream container revolubly mounted therein, said container having on its bottom exterior an eccentrically located pivotal member engaging the bottom of the receptacle, means for revolubly holding the upper end of the container on its center, means for rotating said cream receptacle, dashers within said cream container and means for securing relative movement between said dashers and said cream container.

7. In an ice cream freezer the combination of an ice receptacle a circular cream container revolubly mounted therein, said container having on its bottom exterior an eccentrically located pivotal member engaging the bottom of the receptacle, means for revolubly holding the upper end of the container on its center, means for rotating said cream receptacle, dashers within said container and means for securing relative movement between said dashers and said container.

8. In an ice cream freezer the combination of an ice receptacle a circular cream container revolubly mounted therein, said container having on its bottom exterior an eccentrically located pivotal member engaging the bottom of the receptacle, means for revolubly holding the upper end of the container on its center, means for rotating said cream receptacle, dashers within said container adapted to clear the cream from the inner walls thereof and means for securing relative movement between said dashers and said container.

In witness whereof I have affixed by signature, this 24th day of May, 1923.

NET F. SHARP.